(No Model.)
R. C. LONGSDON.
FEEDER FOR ROLLER MILLS.
No. 339,566. Patented Apr. 6, 1886.
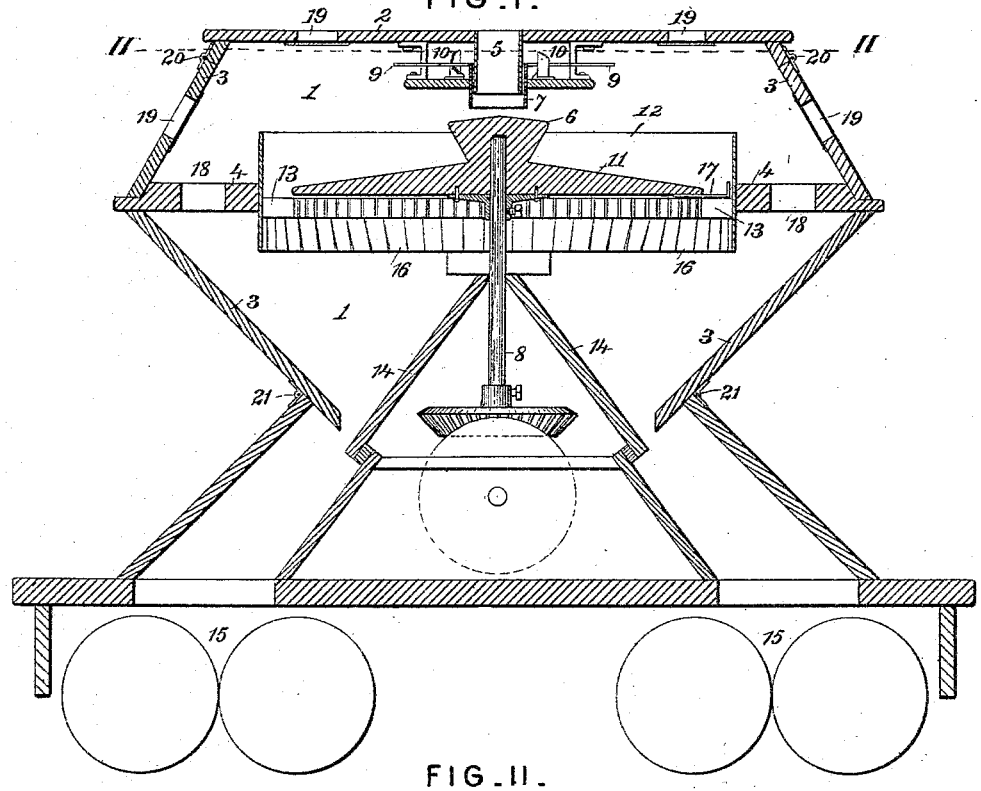
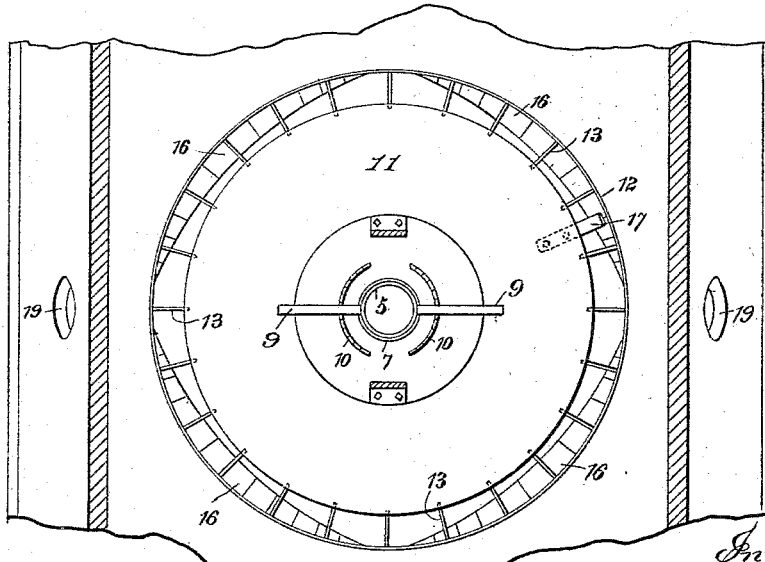
Attest:
Geo. T. Smallwood
L. M. Hopkins
Inventor
Rufus C. Longsdon.
By Knight Bros.
Attys
N. PETERS, Photo-Lithographer, Washington, D. C.

UNITED STATES PATENT OFFICE.

RUFUS C. LONGSDON, OF ST. LOUIS, MISSOURI.

FEEDER FOR ROLLER-MILLS.

SPECIFICATION forming part of Letters Patent No. 339,566, dated April 6, 1886.

Application filed March 30, 1885. Serial No. 160,720. (No model.)

*To all whom it may concern:*

Be it known that I, RUFUS C. LONGSDON, a citizen of the United States, residing at St. Louis, in the State of Missouri, have invented certain new and useful Improvements in Feeders for Roller-Mills, of which the following is a full, clear, and exact specification, reference being had to the accompanying drawings, forming a part thereof, in which—

Figure I is a vertical section through the center of the improved distributer, showing its relation to two pairs of reduction-rolls. Fig. II is a section on the line 11 11, Fig. I, showing the mechanism in plan.

The invention relates more particularly to that class of distributers which are designed to deliver to each of two pairs of rolls an equal amount of material and distribute the same uniformly from end to end thereof. Although the utility of distributers constructed in accordance with and embodying the principles of the said invention are by no means limited to this class of machines, they may be employed in connection with any apparatus where a uniform supply and distribution of the material is desirable.

The invention consists in certain features of novelty, hereinafter fully described, and more particularly pointed out in the claims.

1 represents one of the ends, 2 the top, and 3 the sides, of the casing of the distributer, within which is supported a horizontal table, 4. 5 is a central spout, through which the material descends, and 6 a disk located immediately beneath it, upon which said material falls. The spout 5 is so constructed that its mouth can be placed farther from or closer to the disk 6, accordingly as it is desired to feed a greater or less amount of material to the machine. This is accomplished by forming the said spout in two sections, one of which is fixed and the other of the nature of a sleeve, 7, adjustable vertically thereon. This sleeve may be so placed as to let the desired amount of material escape between its lower extremity and the upper surface of the disk 6, which latter, wherever hereinafter referred to, is called the "feed-disk." The upper surface of the feed-disk 6 is represented in the drawings as being of conical form; but the inclination is, in practice, very slight. It is not intended to be so steep that the material will slide over its surface by gravity, but is designed to support the material until it shall be thrown off therefrom by centrifugal force, the said feed-disk being rotated by a spindle, 8, driven from a suitable moving part of the machine through the medium of suitable gearing. The sleeve 7 is provided on its respective opposite sides with a pair of arms, 9, each of which rests upon a stepped rack or support, 10, which in turn is supported from the top 2 of the casing. These supports are curved and arranged as represented in Fig. II. From the feed-disk 6 the material falls onto another disk, 11, of considerably larger diameter, which is also secured to the spindle 8 and is rotated thereby. This disk 11 is also shown of slightly-conical shape, and is designed to act in the same manner as the feed-disk 6—that is, to throw the material off by centrifugal force, whereby it is spread out or distributed in a uniformly-thin sheet. As the material flies off from this distributing-disk 11 its outward movement is arrested by an annular stop-plate, 12, which surrounds and extends somewhat above the said disk, so as to insure the arrest of all the material, said plate being supported by the table 4. The material as it strikes the inner surface of this stop-plate will tend to a circular motion within the same, which tendency is overcome by a number of partitions or plates, 13, projecting radially inward from the face of the stop-plate 12. When the material comes into contact with these partitions, its circular motion is arrested and it falls vertically in the form of an annular sheet, which, if not intercepted, would be divided equally by the cant-boards 14 14 and delivered to the two pairs of rolls 15 15.

With the mechanism already described an equal amount of material will be delivered to each pair of rolls; but it will not be distributed in equal proportions from end to end thereof. As aforesaid, if the annular sheet of material were not intercepted, it would be divided equally by the cant-boards 14, which would cause a greater amount of material to be delivered to the ends than to the center of the rolls. To overcome this difficulty a number of adjustable deflectors, 16, are placed below the partitions 13. These deflectors are preferably made of sheet metal, so that they may be readily adjusted by bending, and are preferably formed of the same piece which forms the stop-plate 12. The desired result is accomplished by bending a number of the deflectors in such a manner that the material coming in contact therewith will be diverted from its vertical descent and directed toward the center of the rolls, as more clearly represented in Fig. II of the drawings. The side walls, 3, of the casing are inclined in a direction opposite to the cant-boards 14, and project across the path of a portion of the falling sheet of material which it catches and directs onto the cant-boards 14.

17 is a scraper which is secured to the periphery of the distributing-disk 11, and, being carried thereby, moves over and close to the tops of the partitions 13, whereby any material which may be caught is dislodged and the passages between them thereby kept clear. This scraper has an upturned arm, (or, in other words, is of ⌐ shape,) which moves close to the inner surface of the stop-plate 12 and serves to free anything that may adhere thereto.

18 are apertures formed through the table 4 for the passage of the heated vapors arising from the rolls 15, and 19 apertures through the casing, through which said vapors escape, said apertures 19 being provided with wire-gauze or other porous material, to prevent the admission of foreign substances to the inside of the case.

The side walls of the casing are hinged, as at 20 and 21, to permit access to the interior of the casing for regulating the amount of feed and adjusting the deflectors when necessary.

Having thus described my invention, the following is what I claim as new therein and desire to secure by Letters Patent:

1. The combination, with the feed-disk and the section 5, of the adjustable sleeve 7, the arm 9, and the inclined or stepped rack 10, upon which said arm rests, substantially as set forth.

2. The combination, with a feed-spout, of a rotating distributing-disk, an annular stop-plate surrounding said disk, and partitions for arresting the circular motion of the material within said annular stop-plate, as set forth.

3. The combination, with a feed-spout and a rotary disk, 11, for distributing the material by centrifugal action, as described, of an annular stop-plate, 12, surrounding said disk, and deflectors 16, for the purpose set forth.

4. The combination, with a feed-spout and a rotary distributing-disk, of an annular stop-plate surrounding said disk, partitions projecting radially inward from said stop-plate, and adjustable deflectors below said partitions, for diverting the falling material from its natural course and causing it to flow in another direction, as and for the purpose set forth.

5. The combination, with the feed-spout and a distributing-disk, of an annular stop-plate surrounding said disk, the partitions for arresting the circular motion of the material, and deflectors below said partitions, for the purpose set forth.

6. The combination, with the rotary disk 11, the annular plate 12, surrounding the same, and the partitions 13, of the scraper 17, projecting from the periphery of said disk, for the purposes set forth.

7. The combination, with the feed-spout open at its lower end and the rotary feed-disk in close proximity thereto, upon which the material falls, of a rotary distributing-disk, upon which the material falls from the feed-disk, and an annular stop-plate for arresting the outward movement of the material and directing it downward, substantially as set forth.

RUFUS C. LONGSDON.

Witnesses:
 EDWD. E. ALLEN,
 ALFD. H. WHITE.